United States Patent [19]

Nohara

[11] Patent Number: 5,085,821
[45] Date of Patent: Feb. 4, 1992

[54] PREPARATION OF MULTI-LAYER DRAWN POLYESTER BOTTLES

[75] Inventor: Shigezo Nohara, Yokohama, Japan

[73] Assignee: Toyo Seikan Kaisha, Ltd., Tokyo, Japan

[21] Appl. No.: 273,726

[22] Filed: Nov. 18, 1988

Related U.S. Application Data

[63] Continuation of Ser. No. 910,794, Sep. 22, 1986, abandoned, which is a continuation of Ser. No. 604,472, Apr. 27, 1984, abandoned.

[30] Foreign Application Priority Data

Apr. 28, 1983 [JP] Japan .................. 58-73893

[51] Int. Cl.$^5$ ............................. B29C 49/22
[52] U.S. Cl. ........................... 264/515; 264/532; 264/533; 264/535; 264/150; 264/173; 264/296; 425/462; 425/532
[58] Field of Search ............. 264/512, 515, 514, 173, 264/150, 533, 296, 535; 425/462, 532

[56] References Cited

U.S. PATENT DOCUMENTS

| | | | |
|---|---|---|---|
| 3,821,349 | 6/1974 | Mozer | 264/532 |
| 4,217,161 | 8/1980 | Yamada et al. | 264/514 |
| 4,261,473 | 4/1981 | Yamada et al. | 264/512 |
| 4,424,182 | 1/1984 | Cerny | 264/296 |
| 4,649,004 | 3/1987 | Nohara et al. | 264/173 |
| 4,816,304 | 3/1989 | Nohara et al. | 264/514 |

Primary Examiner—Jeffery Thurlow
Attorney, Agent, or Firm—Sherman and Shalloway

[57] ABSTRACT

A multi-layer drawn polyester bottle has a neck portion having an opening on the top end and a fitted or screwed part on the periphery, a bottom portion formed by fusion bonding and closing of a pipe and a barrel portion biaxially molecularly oriented by draw-blowing of the pipe. The pipe is composed of a co-extrudate of inner and outer surface base layers of polyethylene terephthalate and an intermediate layer of an ethylene-vinyl alcohol copolymer having an ethylene content lower than 50 mole %. This multi-layer drawn polyester bottle is prepared by co-extrusion a multi-layer pipe using the coextrudate and, if necessary, interposing an adhesive layer between the two resin layers, cutting the pipe into a predetermined length, closing one end of the cut pipe by fusion bonding to form a bottom portion, forming the other end of the cut pipe into a neck portion having an opening on the top end and a fitted or screwed part on the periphery, pre-heating the so-obtained preform at a drawing temperature of 85° to 120° C. and subjecting the preform to draw-blow-forming biaxially in the axial direction and circumferential direction in a blow-forming mold.

14 Claims, 5 Drawing Sheets

PREPARATION OF MULTI-LAYER DRAWN POLYESTER BOTTLES

This application is a continuation of application Ser. No. 910,794 filed 09/22/86 now abandoned which in turn is a U.S. Ser. No. 604,472 filed 04/27/84 now abandoned.

BACKGROUND OF THE INVENTION

(1) Field of the Invention

The present invention relates to a multi-layer drawn polyester bottle and a process for the preparation thereof. More particularly, the present invention relates to a bottle having a wall biaxially molecularly oriented by drawing and an improved gas barrier property, which comprises a gas barrier layer of an ethylene-vinyl alcohol copolymer and a base layer of a polyester, and a process for the preparation of this bottle.

(2) Description of the Prior Art

At the present, formation of drawn polyester bottles is very popular, and since drawn polyester bottles have an excellent transparency and an appropriate gas barrier property, they are widely used as vessels for liquid products such as liquid detergents, shampoos, cosmetics, soys and sauces and also for carbonated drinks such as beer, cola and cider and refreshing drinks such as fruit juice and mineral water.

However, since a drawn polyester bottle is a kind of a plastic bottle, the drawn polyester bottle has a permeability to oxygen or carbon dioxide gas, though the permeability is very low, while the gas permeability of a completely sealed vessel such as a glass bottle or a metal can is substantially zero. Therefore, the drawn polyester bottle is inferior to a can or glass bottle in the preservability of a filled food, and when the drawn polyester bottle is used for a carbon dioxide gas-incorporated drink, loss of carbon dioxide gas is caused and in case of beer, cola or cider, the shelf life is apparently limited.

As means for improving the gas barrier property of a drawn polyester bottle, there has been proposed a method in which a drawn polyester bottle is coated with a polyvinylidene chloride resin, and a coated bottle of this type has been put into practical use. In order to improve a drawn polyester bottle having inherently an appropriate gas barrier property, it is of no significance to laminate or coat the drawn polyester bottle with a gas barrier resin which is inferior to the polyester in the gas barrier property. Namely, a resin having a higher gas barrier property than that of the polyester should be used for lamination or coating. Therefore, use of thermoplastic resins such as a vinylidene chloride resin, an acrylonitrile resin or a vinyl alcohol resin is expected, but an appropriate resin should be selected while taking the properties and processability of the resin into consideration.

SUMMARY OF THE INVENTION

We found that in the preparation of a multi-layer drawn polyester bottle comprising a base layer of a polyester and a gas barrier layer of an ethylene-vinyl alcohol copolymer, if formation of a pipe by co-extrusion, cutting of the pipe, hot formation of a bottom and biaxial draw-blow formation are combined in this order, a multi-layer drawn polyester bottle excellent in the interlaminar adhesion, gas barrier property and molecular orientation can be obtained. We have now completed the present invention based on this finding.

More specifically, in accordance with one fundamental aspect of the present invention, there is provided a multi-layer drawn polyester bottle comprising a neck portion having an opening on the top end and a fitted or screwed part on the periphery, a bottom portion formed by fusion bonding and closing of a pipe and a barrel portion biaxially molecularly oriented by draw-blowing of the pipe, wherein the pipe is composed of a co-extrudate comprising inner and outer surface base layers of a polyester consisting essentially of ethylene terephthalate units and an intermediate layer of an ethylenevinyl alcohol copolymer having an ethylene content lower than 50 mole %.

In accordance with another fundamental aspect of the present invention, there is provided a process for the preparation of a multi-layer polyester bottle, which comprises forming by co-extrusion a multi-layer pipe by using an ethylene-vinyl alcohol copolymer having an ethylene content lower than 50 mole % as an intermediate layer acting as a gas barrier resin layer and a polyester resin as inner and outer base layer and, if necessary, interposing an adhesive layer between the two resin layers, cutting the pipe into a predetermined length, closing one end of the cut pipe by fusion bonding to form a bottom portion, forming the other end of the cut pipe into a neck portion having an opening on the top end and a fitted or screwed part on the periphery, preheating the so-obtained preform at a drawing temperature of 85° to 120° C. and subjecting the preform to draw-blow-forming biaxially in the axial direction and circumferential direction in a blow-forming mold.

DETAILED DESCRIPTION OF THE PREFERRED EMBODIMENTS

As pointed out hereinbefore, it is a primary object of the present invention to improve a gas barrier property of a drawn polyester bottle, and an ethylene-vinyl alcohol copolymer, especially an ethylene-vinyl alcohol copolymer having an ethylene content lower than 50 mole %, is selected and used among vinyl alcohol type resins. As is known to those skilled in the art, polyvinyl alcohol is not thermoplastic unless it is modified by a special treatment, but in an ethylene-vinyl alcohol copolymer, with increase of the ethylene content, the melting point is reduced and the thermoplastic characteristic is increased. Since the ethylene-vinyl alcohol copolymer is drawn together with a polyester resin, as described hereinafter, it is ordinarily considered that an ethylene-vinyl alcohol copolymer having a lower melting point and a lower drawable temperature should be selected and used. However, in the present invention, an ethylene-vinyl alcohol copolymer having a higher melting point and a higher drawable temperature is selected and used. The first reason is that if the ethylene content exceeds 50 mole %, the melting point and drawable temperature are lowered and co-drawing with a polyester resin is advantageously carried out, but with increase of the ethylene content, the gas barrier property is drastically reduced and lamination of the polyester resin with the ethylene-vinyl alcohol copolymer becomes insignificant. The second reason is that since it has been found that if the process of the present invention is adopted, even an ethylene-vinyl alcohol copolymer having a high vinyl alcohol content can be drawn in the form of a multi-layer structure with a polyester resin at a temperature suitable for drawing of the polyester resin. For these reasons, an ethylene-vinyl alcohol copolymer having an ethylene content lower than 50 mole %, that is, a high vinyl alcohol content, is selected as the ethylene-vinyl alcohol copolymer to be laminated with the polyester resin.

As means for draw-blow-forming of plastics such as polyesters, there are known a process in which a bottomed parison (preform) of a plastic material is formed by injection and the bottomed parison is blow-drawn while drawing it in the axial direction by a drawing rod, and a process in which a plastic material is extruded into a pipe, the pipe is gripped by a pair of clamps and drawn in the axial direction and a fluid is blown into the pipe to effect blow-drawing.

When these processes are applied to a multi-layer parison comprising a polyester layer and an ethylene-vinyl alcohol copolymer layer, fatal defects arise with respect to the drawability and interlaminar adhesion.

In the first place, when the temperature exceeds a certain level, for example, 140° C., a polyester is readily crystallized and drawing becomes difficult, and the polyester is whitened and the formed vessel becomes opaque. In order to prepare a multi-layer parison by injection, it is necessary to inject a polyester resin and then inject an ethylene-vinyl alcohol copolymer on the preliminarily injection-formed polyester resin. Since it is necessary to control the temperature of the preliminarily injection-formed polyester to a level much lower than the above-mentioned critical temperature, heat bonding of both the resins in the interface is incomplete and it sometimes happens that interlaminar peeling is caused or the ethylene-vinyl alcohol copolymer layer is broken in the peeled portion.

In the second place, the drawability, especially the biaxial drawability, of the ethylene-vinyl alcohol copolymer is especially poor at a temperature suitable for drawing of a polyester. More specifically, when a co-extruded multi-layer pipe comprising a polyester layer and an ethylene-vinyl alcohol copolymer layer is drawn in the axial direction in the state gripped by clamps and is then subjected to blow-drawing, many clefts and latent cracks are readily formed in the axial direction in the ethylene-vinyl alcohol copolymer layer. It is considered that a phenomenon resembling fibrillation will be caused in the ethylene-vinyl alcohol copolymer layer by drawing in the axial direction and clefts or cracks will be formed by subsequent blow-drawing.

The first characteristic feature of the present invention is that a polyester and an ethylene-vinyl alcohol copolymer is co-extruded into a pipe. This co-extrusion is accomplished by joining a molten polyester and a molten ethylene-vinyl alcohol copolymer in a die and extruding them through an annular ring. Since both the resins are contacted with each other in the molten state for a certain time, good mingling of both the resins is caused in the interface between the two resins and the degree of heat bonding is much higher than in case of multi-layer injection forming. This effect is attained quite similarly also in the case where an adhesive resin is interposed between the polyester and the ethylene-vinyl alcohol copolymer.

The second characteristic feature of the present invention is that the co-extruded multi-layer pipe is cut into a predetermined length and one end is closed by fusion bonding to form a bottom portion. If this bottomed preform is prepared, it is possible to perform blow-drawing of this preform simultaneously or substantially simultaneously with axial drawing by pressing a drawing rod to the preform which has been preliminarily heated. If this simultaneous drawing is adopted, formation of clefts or latent cracks, which is often observed in case of sequential drawing, can be prevented.

In the present invention, a copolymer obtained by saponifying a copolymer of ethylene with a vinyl ester such as vinyl acetate is used as the ethylene-vinyl alcohol copolymer. In view of the adaptability to the forming operation and the gas barrier property, it is preferred that an ethylene-vinyl alcohol copolymer having an ethylene content of 15 to 50 mole %, especially 25 to 45 mole %, and a saponification degree of at least 96% be used. The molecular weight of the copolymer is not particularly critical, so far as the copolymer has a film-forming property.

Polyethylene terephthalate or a copolyester consisting essentially of ethylene terephthalate units and containing a small amount of known modifying ester units is used as the polyester for attaining the object of the present invention. The molecular weight of the polyester is not particularly critical if the polyester has a film-forming property.

In order to enhance the adhesion between the polyester layer and the ethylene-vinyl alcohol copolymer layer, a known adhesive may be used, though use of the adhesive is not indispensably necessary. A copolyester type adhesive, a polyester-ether type adhesive, an epoxy-modified thermoplastic resin and an acid-modified thermoplastic resin may be used as the adhesive.

Various lamination structures may be adopted for a polyester base layer (PET), an ethylene-vinyl alcohol copolymer layer (EVAC) and an adhesive layer (AD). For example, there may be adopted structures of PET-/EVAC/PET, PET/EVAC+AD/PET and PET-/AD/EVAC/AD/PET, in which the inner layer is indicated on the right side and the outer layer is indicated on the left side.

The thicknesses of the respective layers may be changed in broad ranges, but it is preferred that the PET/EVAC thickness ratio be in the range of from 2/1 to 30/1, especially from 4/1 to 15/1. In the case where the adhesive layer is used, it is preferred that the PET-/AD thickness ratio be in the range of from 5/1 to 100/1, especially from 10/1 to 50/1.

Figure 1A:
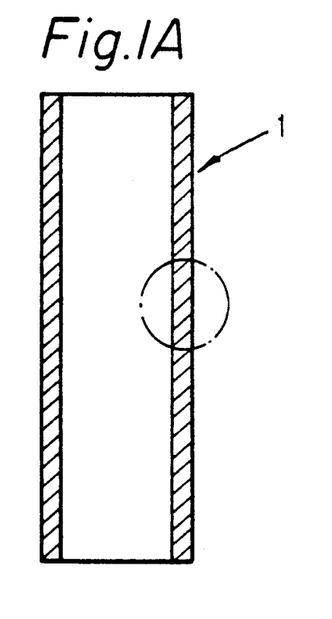
FIG. 1 is a sectional view showing a multi-layer pipe used in carrying out the present invention.
Figure 1B:
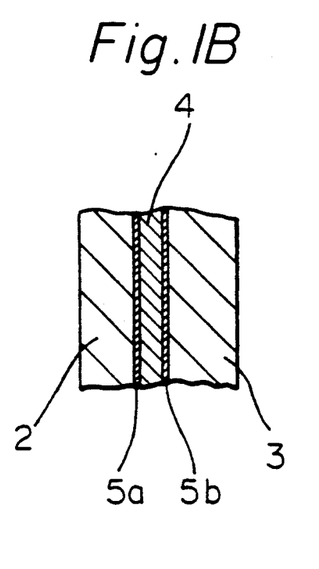

FIG. 1 shows a multi-layer pipe especially preferably used in carrying out the present invention. This multi-layer pipe 1 comprises inner and outer layers 2 and 3 of a polyester, an intermediate gas-barrier layer 4 of an ethylene-vinyl alcohol copolymer and interposed adhesive layers 5a and 5b.

As pointed out hereinbefore, it is important that this pipe should be prepared by co-extrusion. In order to prevent crystallization of the polyester, it is important that the extruded pipe should be quenched by water immersion or the like.

If the extruded multi-layer pipe is thus quenched, the polyester layer in the outer surface of the pipe is easily fixed in the amorphous state where the density is in the range of 1.331 to 1.339 g/cc as measured at 20° C. Incidentally, the density referred to in the instant specification means a value measured at 20° C. by using an n-heptane/carbon tetrachloride liquid mixture density-gradient tube. However, the polyester resin located on the inner wall surface of the pipe apart from the cooled outer wall surface is maintained for a long time at a temperature higher than the temperature of the polyester resin of the outer surface layer. Even in the molten state, the ethylene-vinyl alcohol copolymer has a thermal conductivity coefficient corresponding to from about ⅓ to about ¼ of that of the polyester. By dint of this characteristic, the ethylene-vinyl alcohol copolymer intermediate layer acts as a heat insulation layer in the multi-layer pipe being cooled and solidified. Therefore, the inner surface polyester layer is maintained at a high temperature for a long time and crystallization is advanced in the polyester of the inner surface layer, and the density is increased to a level as high as 1.355 g/cc. As the result, the polyester of the inner surface layer is whitened, the transparency is lost and drawing of the inner surface layer becomes difficult. In the present invention, the polyester of the inner surface layer is forcibly cooled by passing a cold medium through the interior of the co-extruded pipe so that the density of the final multi-layer preform is controlled to a level equal to or higher by upto 0.015 g/cc than the density of the polyester of the outer surface layer, whereby whitening of the polyester of the inner surface layer is prevented and the drawability of the polyester of the inner surface layer is improved.

Figure 2:
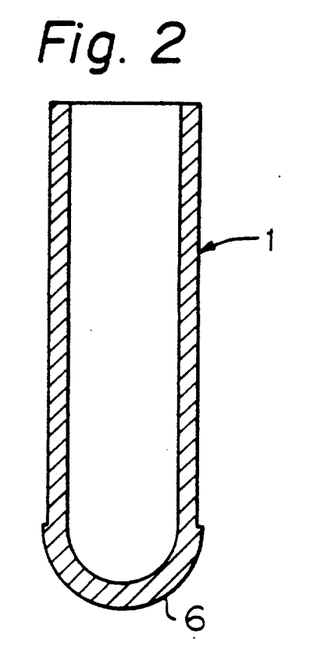
FIGS. 2 and 3 are sectional views showing a preform in which a bottom portion and a neck portion are formed.

The pipe is cut in a predetermined length, and one end of the cut pipe is heated and fused and is pressed by male and female molds having a cavity and projections corresponding to a desired bottom shape, for example, a semi-spherical shape, to form a bottom portion 6 as shown in FIG. 2.

Figure 3:
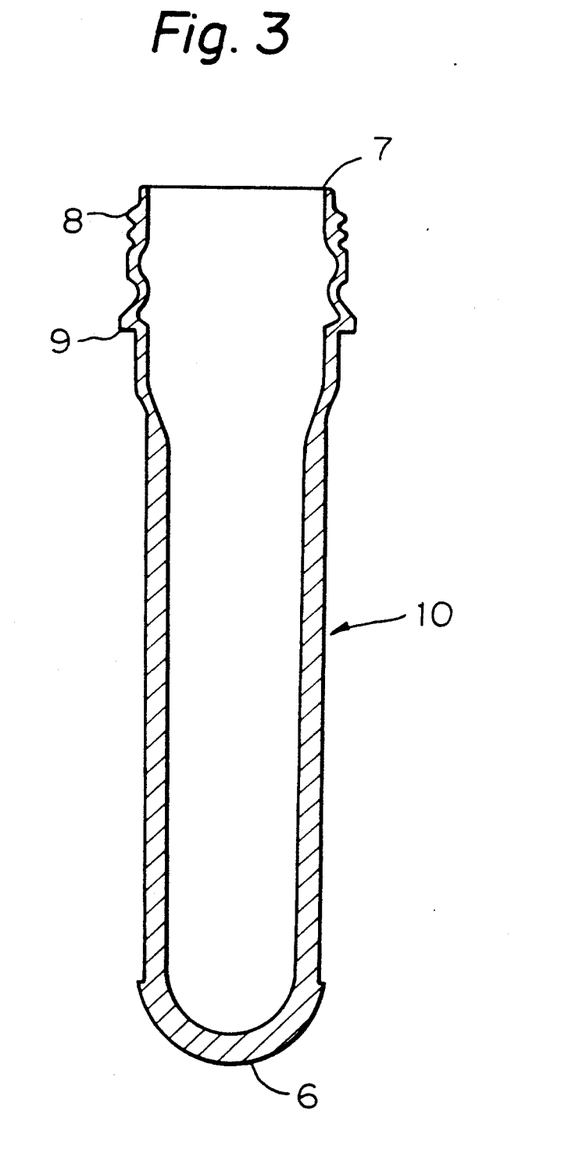

Then, the other end of the pipe 1 is heated and subjected to pressing, drawing and blow-forming in a desired mold to form a preform 10 having an opening 7 on the top end and a fitted, screwed or anchoring portion for a lid, such as a screw 8 or a neck ring (support ring) 9, on the periphery, as shown in FIG. 3.

The order of the steps for preparing the above-mentioned preform is not particularly critical. Namely, the steps may be conducted in the above-mentioned order or in the reverse order.

If the above-mentioned process is adopted, no superfluous resin portion is formed in preparing a preform from a multi-layer pipe.

At the subsequent step, the preform is heated by hot air, an infrared ray heater or high frequency induction heating to a temperature suitable for drawing of the multi-layer preform. Namely, the preform is heated to a drawing temperature for the polyester resin, ordinarily 85° to 120° C., preferably 95° to 110° C.

Figure 4:
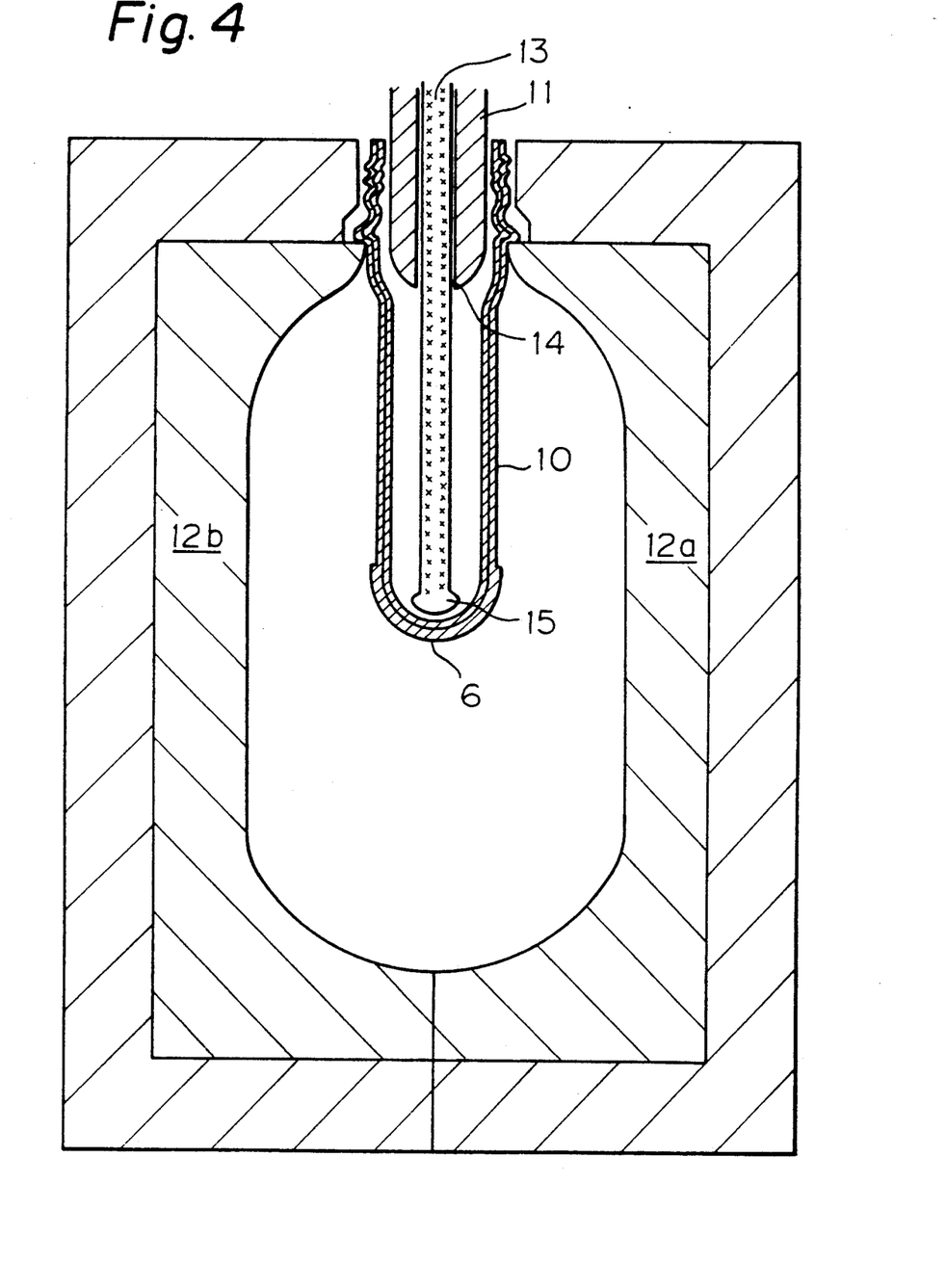
FIGS. 4 and 5 are sectional views showing a preform held in a blow mold before and after blow forming, respectively.
Figure 5:
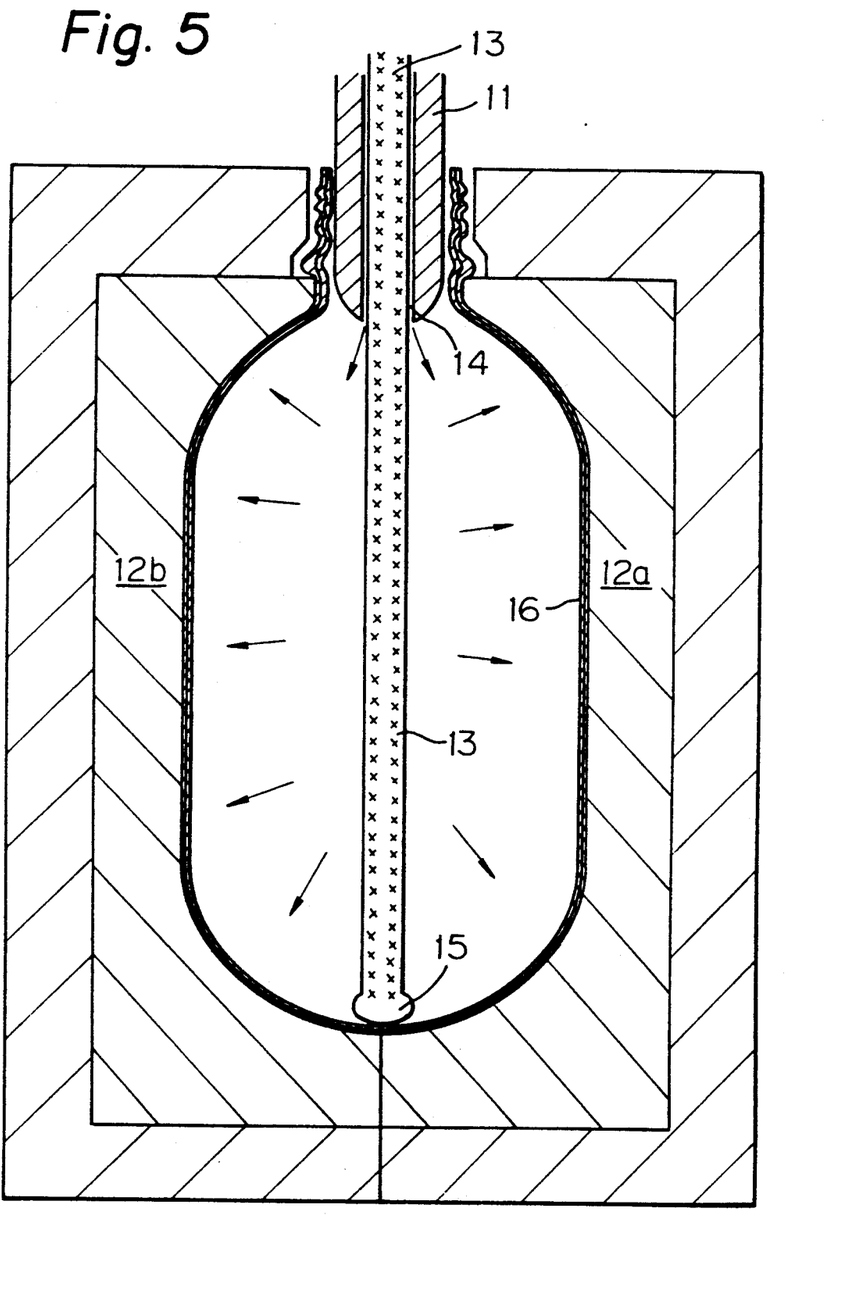

Referring to FIGS. 4 and 5 illustrating the draw-blow-forming operation, a mandrel 11 is inserted into the opening of the preform 10 and the opening is gripped by a pair of split molds 12a and 12b. A vertically movable drawing rod 13 is arranged coaxially with the mandrel 11, and a fluid blowing annular passage 14 is formed between the drawing rod 13 and the mandrel 11.

In the present invention, the top end 15 of the drawing rod 13 is applied to the inner side of the bottom 6 of the preform 10 and the drawing rod 13 is moved downward, whereby the preform 10 is drawn in the axial direction. Simultaneously, a fluid is blown into the preform 10 through the passage 14, whereby the preform 10 is expanded and drawn in the circumferential direction by the pressure of the fluid.

According to the present invention, it has been found that by performing drawing in the axial direction and drawing in the circumferential direction simultaneously or substantially simultaneously, even a layer of an ethylene-vinyl alcohol copolymer having a high vinyl alcohol content can be drawn at a relatively low temperature.

This finding is quite surprising in view of the fact that drawing of an ethylene-vinyl alcohol copolymer is very difficult and even when a film of this copolymer is drawn sequentially in the longitudinal direction and in the lateral direction even at a temperature suitable for drawing, the film is ruptured during the drawing operation, as pointed out hereinbefore.

Furthermore, if it is taken into consideration that in draw-blow-forming of a multi-layer pipe of a polypropylene layer and an ethylene-vinyl alcohol copolymer layer, the ethylene-vinyl alcohol copolymer in the multi-layer structure can be drawn only at a considerably high temperature of 140° to 165° C., it is quite surprising that according to the present invention, the ethylene-vinyl alcohol copolymer can be biaxially drawn at a drawing temperature for a polyester resin, that is, such a low temperature as 85° to 120° C., especially 95° to 110° C.

The reason is considered to be that co-extrusion is carried out in the state where the ethylene-vinyl alcohol copolymer layer is placed on the polyester layer, interlaminar peeling is controlled between both the resin layers and biaxial drawing is simultaneously effected in the well-balanced state.

Figures 6A, 6B:
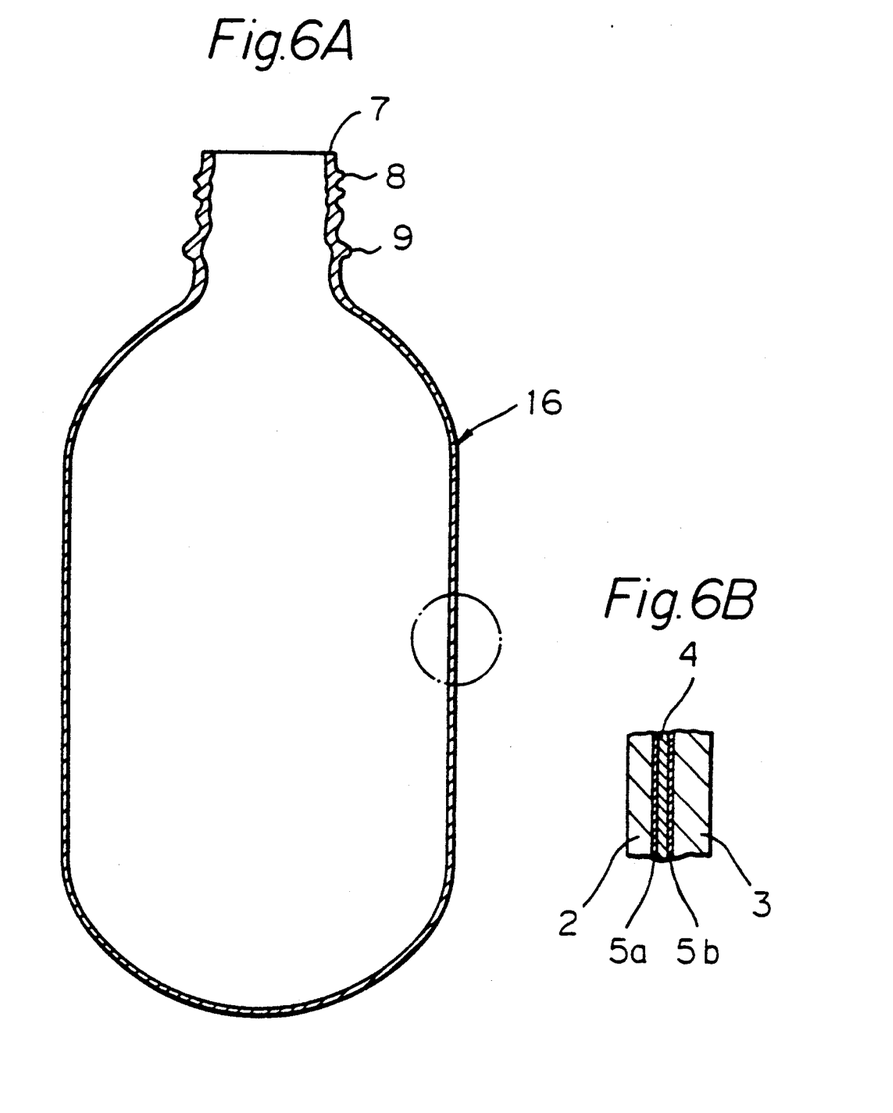
FIG. 6 is a view showing a multi-layer drawn bottle prepared according to the process of the present invention.

Thus, a multi-layer drawn polyester bottle 16 as shown in FIG. 6 is obtained. In the multi-layer draw-blown bottle of the present invention, the layer structure is molecularly oriented so that the density of the polyester layer constituting the outer surface is at least 1.345 g/cc, especially at least 1.348 g/cc, as in case of an ordinary draw-blown polyester bottle. One of the characteristic features of the bottle of the present invention is that the polyester layer constituting the inner surface, as well as the outer surface layer, is molecularly oriented so that the density of the inner surface layer is at least 1.345 g/cc, especially at least 1.348 g/cc.

Moreover, this bottle is characterized in that also the ethylene-vinyl alcohol copolymer constituting the intermediate layer is biaxially molecularly oriented so that the orientation coefficient (l) in the axial direction of the bottle and the orientation coefficient (m) in the circumferential direction, determined according to the polarized fluorimetry, satisfy the following requirements: the value of $l+m$ is at least 0.2, especially at least 0.3, and the value of $|l-m|$ is smaller than 0.1, especially smaller than 0.07.

The two-dimensional orientation of the vessel wall (orientation in the plane of the vessel wall) can be determined according to the polarized fluorimetry.

As described in, for example, Yasunori Nishijima, Polymers, 15, No. 175, page 868 (published by the Japanese Polymer Association in 1966), the two-dimensional orientation coefficients can be determined according to the method in which the degree or mode of the molecular orientation of a thermoplastic resin as a polymer by solid deformation or by flowing in the form of a solution or melt is qualitatively and quantititatively determined by utilizing the optical anisotropy of a fluorescent polymer. If the two-dimensional orientation in the wall plane of the draw-formed vessel of the present invention is considered in the light of the teaching of the above-mentioned technical report, the two-dimensional orientation may be quantitatively expressed by the following formula:

$$I''(\omega) = K\phi(l \cos^4\omega + m \sin^4\omega + \tfrac{1}{2}n)$$

wherein $I''(\omega)$ stands for the intensity of the polarized component of the fluorescence of a thermoplastic resin system as a sample, " indicates that the vibration direction of the incident polarized light is in parallel to the direction of the measured polarized light, $\omega$ stands for the rotation angle of the sample to the vibration direction of the fluorescence, K stands for the maximum excitation probability when the molecular axis of the sample is in parallel to the vibration direction of the excited fluorescence, $\phi$ indicates the molecular fluorescence contraction, l stands for the proportion of the molecular orientation in the axial direction in the wall plane of the final formed vessel, m stands for the proportion of the molecular orientation in the direction rectangular to the axial direction (that is, the circumferential direction), n stands for the proportion of non-orientation in the plane, and $l+m+n$ is 1.

The above-mentioned value of $l+m$ indicates that the ethylene-vinyl alcohol copolymer is effectively biaxially molecularly oriented. By this in-plane molecular orientation, the bottle of the present invention is highly improved in the oxygen barrier property and transparency over a bottle in which the ethylene-vinyl alcohol copolymer is not oriented.

The absolute value of the difference between l and m, that is, the value of $|l-m|$, has a relation to the balance between the molecular orientation in the axial direction of the bottle and the molecular orientation in the circumferential direction of the bottle in the ethylene-vinyl alcohol copolymer. In the vessel of the present invention, since the value of $|l-m|$ is smaller than 0.1, the molecular orientation in the axial direction is well-balanced with the molecular orientation in the circumferential direction.

A bottle in which in the intermediate layer of the central part of the barrel portion, the value of $l+m$ is at least 0.2 and the value of $|l-m|$ is smaller than 0.1 is obtained for the first time according to the process of the present invention. Namely, in the present invention, by forming a pipe by co-extruding inner and outer layers of polyethylene terephthalate and an intermediate layer of an ethylene-vinyl alcohol copolymer, it is made possible to perform draw-blow-forming so that the value of $l+m$ is at least 0.2, and by blow-drawing the perform in the circumferential direction simultaneously or substantially simultaneously with drawing in the axial direction, it is made possible to maintain the orientation balance $|l-m|$ below 0.1, whereby formation of cracks or pinholes in the ethylene-vinyl alcohol copolymer layer can be prevented.

According to the sequential biaxial draw-blow-forming process in which a multi-layer pipe is drawn in the axial direction and is then blow-drawn in the circumferential direction, the value of the orientation coefficient (l) in the axial direction is increased but the value of the orientation coefficient (m) in the circumferential direction is drastically lessened, resulting in reduction of the shock resistance and oxygen barrier property.

In the bottle of the present invention, even the intermediate layer composed of an ethylene-vinyl alcohol copolymer is molecularly oriented in the well-balanced state in both the axial direction and the circumferential direction, and the oxygen permeation coefficient is maintained at a very low level and the transparency is improved. Furthermore, these excellent characteristics can be maintained even if shocks are given to the bottle by falling or vibration or if the bottle is thermally set so as to improve the dimensional stability.

The bottle of the present invention has not only a high transparency but also a much higher gas barrier property than that of other plastic bottles or a bottle composed solely of a polyester (drawn PET bottle). Furthermore, the gas barrier property can optionally be adjusted, and the bottle has a high pressure resistance. Therefore, the filling preservability of carbon dioxide gas-incorporated drinks such as beer, cola and cider can be increased. Furthermore, the bottle of the present invention is excellent from the sanitary view point, and when the used bottle is subjected to incineration, generated gases are substantially carbon dioxide gas and water vapor and no harmful gas is produced. Therefore, the bottle of the present invention is excellent in the adaptability to the incineration treatment. Moreover, the bottle of the present invention is comparable to a glass bottle in the transparency, gas barrier property and pressure resistance, and it also has a light weight and a high resistance to breakage. Accordingly, an ideal bottle is provided.

The present invention will now be described in detail with reference to the following examples that by no means limit the scope of the invention.

EXAMPLE 1

By using extruders for inner and outer layers, provided with a full-flighted screw having a diameter of 65 mm and an effective length of 1430 mm, extruders for an intermediate layer and adhesive layers, provided with a full-flighted screw having a diameter of 50 mm and an effective length of 1100 mm, and a 5-layer annular die, a three-kind five-layer laminate pipe comprising inner and outer layers of polyethylene terephthalate (PET) having an intrinsic viscosity of 1.0, an intermediate layer of an ethylene-vinyl alcohol copolymer (EVAC) having a vinyl alcohol content of 70 mole % and interposed adhesive layers of modified high density polyethylene grafted with maleic anhydride, in which 10000 ppm of epoxidized octyl oleate was incorporated, was extruded into water from the die to cool the outer portion of the pipe and simultaneously, nitrogen gas was blown into the interior of the pipe to cool the inner portion of the pipe. This pipe had an outer diameter of 30 mm and an inner diameter of 22 mm, and the thicknesses of the inner layer, outer layer, adhesive layer and intermediate layer were 1.4 mm, 2.0 mm, 0.05 mm and 0.5 mm, respectively. The pipe was cut into a predetermined size (the length was 129 mm and the weight was 55 g). One end of the pipe was heated at 220° C. and fusion-closed to form a semi-spherical bottom. The other end of the pipe was heated at 150° C. to promote the crystallization of the neck portion and a screwed portion and a neck ring were formed to obtain a preform having a total height of 148 mm.

The preform was heated at 105° C., and the preform was subjected to substantially simultaneous biaxial draw-blow-forming in a blow mold by stretching the preform at a draw ratio of 1.9 in the longitudinal direction and blow-drawing the preform at a draw ratio of 3.0 in the lateral direction, whereby a multi-layer drawn bottle having an inner volume of 1550 cc was prepared.

In the barrel portion of this bottle, the density of PET of the outer layer was 1.355 g/cc and the density of PET of the inner layer was 1.365 g/cc, and in the intermediate EVAC layer, the orientation coefficients l and m were 0.34 and 0.38, respectively. The oxygen permeability of the bottle was about 1.5 cc/m². 24 hours.atm (37° C.), and the bottle was excellent in the transparency. When the bottle was let to fall down on a concrete floor from a height of 120 cm, the bottle was not broken, and no interlaminar peeling was caused. Since the neck portion of this bottle was considerably crystallized, even if the bottle was filled with a liquid maintained at 93° C. and sealed, no deformation of the neck portion was caused.

EXAMPLE 2

By using the same apparatus as used in Example 1, a two-kind three-layer laminate pipe comprising inner and outer layers of polyethylene terephthalate (PET) having an intrinsic viscosity of 0.9 and an intermediate layer of an ethylene-vinyl alcohol copolymer (EVAC) having a vinyl alcohol content of 58 mole % was extruded into water to cool the outer portion of the pipe, and simultaneously, air was blown into the interior of the pipe to cool the inner portion of the pipe. The pipe had an outer diameter of 22 mm and an inner diameter of 16 mm. The thicknesses of the outer layer, inner layer and intermediate layer were 1.6 mm, 1.2 mm and 0.2 mm, respectively. The pipe was cut into a predetermined size (the length was 85 mm and the weight was 20 g). One end of the pipe was heated at about 230° C. and fusion-closed to form a semi-spherical bottom, and in order to prevent crystallization of the neck portion, the other end was preliminarily heated at about 110° C. and a screw and a neck ring were formed to obtain a preform.

The preform was heated at 100° C. and was subjected to substantially simultaneous biaxial draw-blow-forming at a draw ratio of 1.8 in the longitudinal direction and at a draw ratio of 2.5 in the lateral direction to obtain a multi-layer drawn bottle having an inner volume of 500 cc.

In the barrel portion of this bottle, the density of PET of the outer layer was 1.352 g/cc and the density of PET of the inner layer was 1.357 g/cc, and the orientation coefficients l and m of EVAC were 0.31 and 0.35, respectively. The oxygen permeability of the bottle was 2.0 cc/m².24 hours.atm (37° C.). When the bottle was let to fall down on a concrete floor from a height of 120 cm, the bottle was not broken.

EXAMPLE 3

A three-kind 5-layer laminate pipe was prepared in the same manner as described in Example 1 except that only the outer portion was cooled.

The pipe was subjected to substantially simultaneous biaxial draw-blow-forming under the same conditions as adopted in Example 1 to obtain a multi-layer drawn bottle having an inner volume of 1550 cc.

The inner layer of the bottle was milky white and the bottle was slightly inferior to the bottle obtained in Example 1 in the transparency.

EXAMPLE 4

A laminate pipe and then a preform were prepared under the same conditions as described in Example 1. The preform was heated at 105° C., and the preform was drawn at a draw ratio of 1.7 in the longitudinal direction. Then, the preform was drawn at a draw ratio of 3.0 in the lateral direction in a blow mold. A multi-layer drawn bottle having an inner volume of 1550 cc was obtained by this sequential draw-blow-forming.

Cracks were formed in the intermediate EVAC layer, and the oxygen permeability of the bottle was 3.1 cc/m².24 hours.atm (37° C.), and the appearance was inferior to that of the bottle obtained in Example 1.

I claim:

1. A process for the preparation of a multi-layer polyester bottle, which comprises forming by co-extrusion, a multi-layer pipe of an ethylene-vinyl alcohol copolymer layer having an ethylene content lower than 50 mole % as an intermediate layer acting as a gas barrier resin layer, a polyester resin as inner and outer base layers and an adhesive layer interposed between the two resin layers, cutting the pipe into a predetermined length, heating one end of the cut pipe and pressing the heated end of the cut pipe by male and female molds having a cavity and projections corresponding to a bottom shape, thereby closing one end of the cut pipe by fusion bonding to form a bottom portion, forming the other end of the cut pipe into a neck portion having an opening on the top end and a fitted or screwed part on the periphery, pre-heating the so-obtained preform at a drawing temperature of 85° to 120° C. and blow-drawing the preform in the circumferential direction substantially simultaneously with drawing in the axial direction and at a draw ratio such that the draw ratio in the circumferential direction is higher than the draw ratio in the axial direction to form a multi-layer bottle, wherein the intermediate layer of the ethylene-vinyl alcohol copolymer is biaxially molecularly oriented so that the orientation coefficient (l) in the axial direction of the bottle and the orientation coefficient (m) in the circumferential direction of the bottle, each being determined according to the polarized fluorimetry, satisfy such requirements that the value of $l+m$ is at least 0.2 and the value of $|l-m|$ is smaller than 0.1.

2. A process according to claim 1, wherein the outer surface polyester layer of the preform has a density (20° C.) of 1.331 to 1.339 g/cc and the inner surface polyester layer has a density (20° C.) equal to or higher by up to 0.015 g/cc than the density of the outer surface polyester layer.

3. A process according to claim 1, wherein a drawing rod is pressed to the bottom portion of the preliminarily heated preform to draw the preform in the axial direction, and blow-drawing of the preform is carried out substantially simultaneously with said drawing in the axial direction.

4. A process according to claim 1 wherein the ethylene-vinyl alcohol copolymer has an ethylene content of 25 to 45 mole %, and a saponification degree of at least 96%.

5. A process according to claim 1 wherein the polyester resin comprises polethylene terephthalate or a copolyester consisting essentially of ethylene terephthalate units with a small amount of modifying ester units.

6. A process according to claim 1 wherein the thickness ratio of the polyester resin to the ethylenevinyl alcohol copolymer is from 4/1 to 15/1 and the thickness ratio of the polyester to the adhesive is in the range of from 10/1 to 50/1.

7. A process according to claim 1 wherein the preform is pre-heated at a drawing temperature of from 95° C. to 110° C.

8. A process for the preparation of a multi-layer polyester bottle, which comprises forming by co-extrusion a multi-layer pipe of an ethylene vinyl alcohol copolymer layer having an ethylene content lower than 50 mole % as an intermediate layer acting as a gas barrier resin layer, a polyester resin as inner and outer base layers, and an adhesive layer interposed between the two resin layers, quenching the outer polyester resin layer of the co-extruded pipe by water immersion and forcibly cooling the inner polyester resin layer by passing a cold medium through the interior of the co-extruded pipe, cutting the pipe into a predetermined length, closing one end of the cut pipe by fusion bonding to form a bottom portion, forming an opening on the top end and a fitted or screwed part on the periphery, pre-heating the so-obtained preform at a drawing temperature of 85° to 120° C. and blow-drawing the preform in the circumferential direction substantially simultaneously with drawing in the axial direction at a draw ratio such that the draw ratio in the circumferential direction is higher than the draw ratio in the axial direction to form a multi-layer bottle, wherein the intermediate layer of the ethylene-vinyl alcohol polymer is biaxially molecularly oriented so that the orientation coefficient (l) in the axial direction of the bottle and the orientation coefficient (m) in the circumferential direction of the bottle, each being determined according to the polarized fluorimetry, satisfy such requirements that the value of $l+m$ is at least 0.2 and the value of $|l-m|$ is smaller than 0.1.

9. A process according to claim 8 wherein the outer surface polyester layer of the preform has a density (20° C.) of 1.331 to 1.339 g/cc and the inner surface polyester layer has a density (20° C.) equal to or higher by up to 0.015 g/cc than the density of the outer surface polyester layer.

10. A process according to claim 8 wherein a drawing rod is pressed to the bottom portion of the preliminarily heated preform to draw the preform in the axial direction, and blow-drawing the preform is carried out substantially simultaneously with said drawing in the axial direction.

11. A process according to claim 8 wherein the ethylene-vinyl alcohol copolymer has an ethylene content of 25 to 45 mole %, and a saponification degree of at least 96%.

12. A process according to claim 8 wherein the polyester resin comprises polyethylene terephthalate or a copolymer consisting essentially of ethylene terephthalate units with a small amount of modifying ester units.

13. A process according to claim 8 wherein the thickness ratio of the polyester resin to the ethylene-vinyl alcohol copolymer is from 4/1 to 15/1 and the thickness ratio of the polyester to the adhesive is in the range of from 10/1 to 50/1.

14. A process according to claim 8 wherein the preform is pre-heated at a drawing temperature of from 95° C. to 110° C.

* * * * *